Jan. 23, 1940.                H. G. TEXTER                2,187,798
                        METHOD OF MAKING JOINTS
                         Filed Dec. 27, 1938
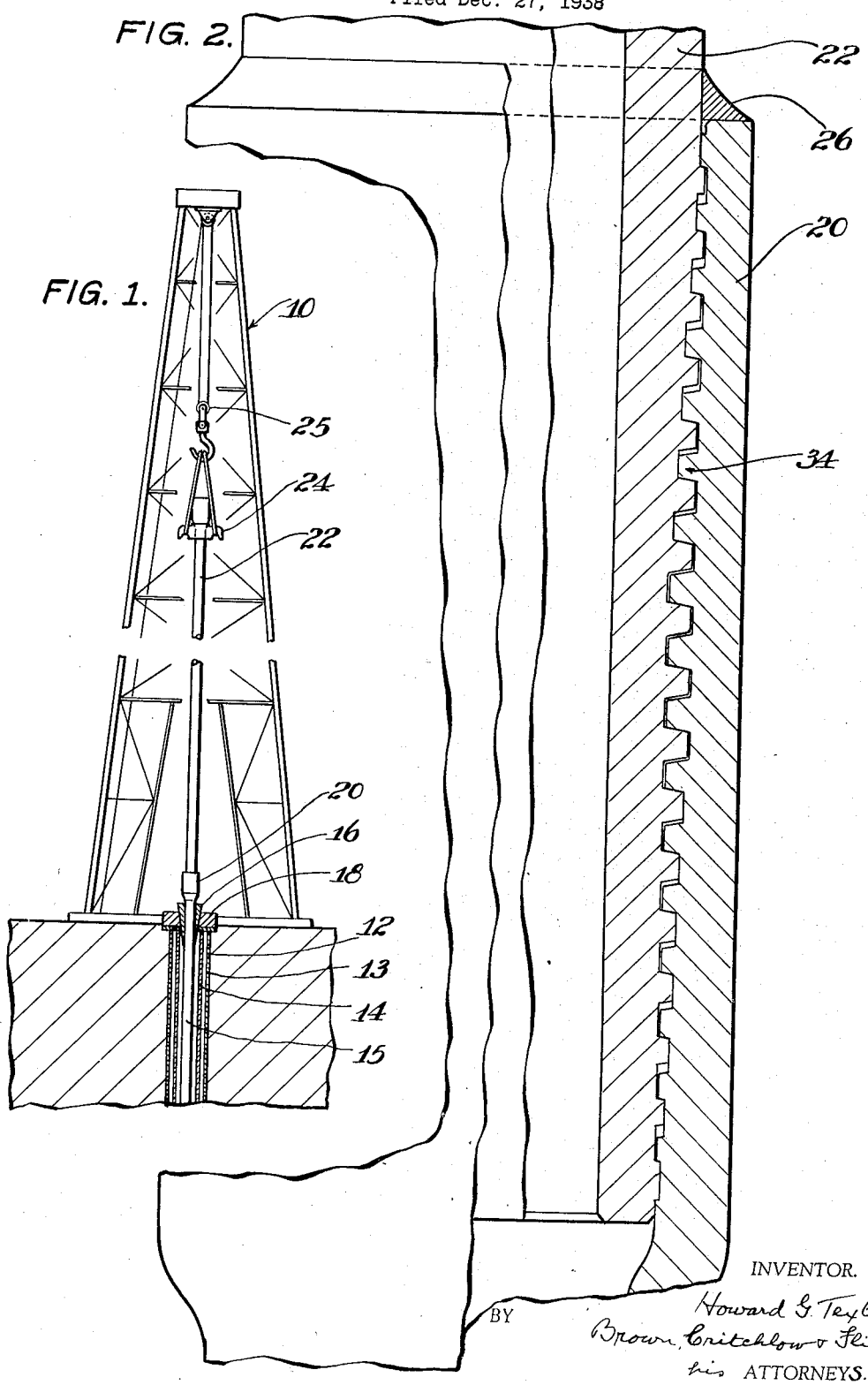
INVENTOR.
Howard G. Texter
BY Brown, Critchlow & Flick
his ATTORNEYS.

Patented Jan. 23, 1940

2,187,798

UNITED STATES PATENT OFFICE 2,187,798

METHOD OF MAKING JOINTS

Howard G. Texter, Tulsa, Okla., assignor to The National Supply Company, Pittsburgh, Pa., a corporation of Pennsylvania Application December 27, 1938, Serial No. 247,756

6 Claims. (Cl. 166—4)

This invention relates to methods for making joints for oil well casing and the like.

Heretofore, in the casing of oil wells or similar deep holes it has been the standard practice to join the individual lengths of casing together with a threaded joint. The design and manufacture of suitable threaded joints for joining oil well casing has entailed many difficulties inasmuch as the joints should be capable of withstanding very severe pull-out stresses and should be fluid tight at all times. It will be recognized that a string of casing is no stronger than the strength of the individual joints which connect the casing lengths and that such joints must resist high tensional forces, as, for example, when the casing is thousands of feet long. Usually a joint which is strong in axial pull does not particularly adapt itself to leak-resistance unless the individual thread forms are cut to very close tolerances, which entails many manufacturing complications and costs.

In all events, the cost and difficulties attending the use of threaded casing joints has, within the last few years, caused some considerable activity in welding casing lengths end to end. The use of welded joints, while allegedly less expensive than threaded joints, has been found to be open to the very serious objection that such joints are very apt to fail in use. Specifically, the use of welded joints for casing has been limited to a very few large operators and to the shallower wells, because experience has shown that in too many instances the welded joint has let go and dropped the string of casing. This has necessitated fishing out the casing and rewelding with the very appreciable attending costs and complications.

It is the general object of my invention to avoid and overcome the foregoing difficulties attending the use of threaded casing joints and the use of welded casing joints by combining the best features of both by an improved method to thereby provide an improved casing joint which is both threaded and welded.

Another object of my invention is the provision of an improved method for joining casing lengths end to end by a threaded joint which is suitably sealed.

Another object of my invention is to provide an improved method whereby a combined threaded and welded joint for oil well casing or the like and in which the threaded connection carries all or substantially all of the axial load on the joint and the weld material effects a seal, and wherein the weld material is under substantially no strain when the joint is subjected to axial load of the type encountered in use.

Another object of my invention is the provision of an improved method whereby an improved threaded joint for oil well casing or the like is constructed, which joint need not seal and therefore can be made without close production tolerances so that quantity production can be readily obtained with a minimum of cost, and which is combined with a suitable stress-free sealing medium.

Another object of my invention is to provide an improved method of applying a ring of welding and/or sealing material to a joint for oil well casing or the like so that the welding and/or sealing material will be under little or no strain in the use of the joint.

The foregoing and other objects of my invention are achieved by that method of casing an oil well or the like which includes the steps of supporting the casing string near its top by the usual slips or similar means, connecting another length of casing by a threaded joint to the string, connecting the added length of casing to the elevator, raising the elevator to put at least part of the weight of the string on the threaded joint, and while so supported sealing the joint, preferably by welding a ring of metal around the joint.

In following the practice of my invention, I provide a threaded joint for oil well casing or the like having a seal of welded metal or the like as just described in conjunction with male and female joint members formed with complementary threads thereon. The complementary threads are particularly adapted to resist axial tensional stress and, as they need perform no sealing operation, can be readily cut in production without close tolerance requirements. The relation of the seal of welding metal or the like to the joint is such that when the joint is subjected to relatively high axial pull the seal is substantially free of strain.

The method of my invention results in a threaded joint for oil well casing or the like and comprising male and female joint members formed with complementary threads thereon and having an endless ring of weld material sealing the joint and connecting the large end of the female member and the body of the male member, the weld material being substantially free of strain when the joint is subjected to the load of supporting a string of casing or part of the load thereof.

For a better understanding of my invention, reference should be had to the accompanying drawing in which Fig. 1 is a diagrammatic side elevation, partly broken away in section, of an oil well derrick and illustrating one manner of practicing the improved method of my invention; and Fig. 2 is a side elevation, partly broken away in section, of a threaded and welded joint constructed in accordance with the principles of my invention with the size and dimensions thereof being somewhat exaggerated to illustrate the invention.

Referring particularly to Fig. 1 of the drawing, the numeral 10 indicates generally a standard well derrick positioned over a hole 12 drilled in the earth and lined part way down by suitable casing strings, marked 13 and 14. In accordance with standard practice, the string of casing 15, which is being inserted in the well, is held by slips or other suitable means 16 by a spider 18 so that the upper or female end 20 of a length of casing extends above the derrick floor. Still in accordance with standard practice an additional length of casing, marked 22, is then picked up by the elevator 24 and traveling block 25 and is aligned with the casing 15 after which the lower or male end of the casing 22 is stabbed into the upper or female end 20 of the length of casing at the upper end of the casing string 15 and the threaded joint between the male and female ends of the casing is spun or screwed home with or without the use of tongs.

From the point just described my improved method differs from that practiced in the prior art inasmuch as I now raise the elevator 24 to put all of the weight, or at least a part of the weight of the casing string 15, on the newly made threaded joint above the spider 18. In order to put only part of the weight of the string on the upper joint, I may raise the elevator to take some of the load off the slips or I may lift the string clear of the slips and then replace the slips and ease part of the weight back onto the slips by paying out on the cable and lowering the elevator.

With at least part of the weight of the casing string on the joint, I then place a ring or bead 26 (see Fig. 2) of welding material around the upper end of the joint and between the male and female members forming the joint so as to effect a positive sealing of the joint. It will be understood that I contemplate using sealing means other than welding in conjunction with my invention. For example, I may seal by brazing, soldering, or any other suitable means, although welding is preferred. It will be recognized that during the welding operation the lengths of casing are in perfect alignment because they hang as a plumb line or bob. Thus, the matter of alignment, which has always caused trouble in welded joints, is taken care of automatically. Once the welding material 26 has set, the slips 16 are then removed and the casing is lowered into the well to bring the length of casing 22 just added to the string so that its upper end protrudes above the spider 18 after which the slips 16 are again set and the entire operation is repeated. This is continued until the entire string of casing is placed in the well. Of course, any and all of the casing strings in the entire casing program can be set in similar fashion, although it will be understood that in relatively short casing strings where the axial pull on the joints is small, the necessity to relieve the weld of strain is not so important.

From the foregoing description it will be recognized that in accordance with my improved method of casing an oil well or the like, each joint between individual lengths of casing includes a threaded connection which may be of a standard type but which is preferably of the particular type of thread hereinafter specifically described and claimed. Further, each casing joint includes a ring or bead of welding material which seals the parts of the joint against leakage. The welding material is applied when the threaded part of the joint is under considerable axial load, as, for example, the load to which it is subjected in service, so that in the use of the joint there is no tendency to strain the welded seal which might crack or rupture it.

It might be well to note here that in a standard threaded joint for oil well casing, now and for many years accepted by the American Petroleum Institute, there is a very definite radial movement between the end of the female member of a joint and the opposed portion of the male member of the joint when the joint is subjected to axial pull. This relative radial movement increases the tendency to leak and may rupture an associated welding seal. Further, there is a longitudinal movement between the parts of the joint in the region of the sealing weld. A similar longitudinal movement between the joint parts occurs in the threaded joint herein particularly illustrated and described. I have found, for example, by actual tests that in a string of casing 6000 feet long, 5½ inches in diameter, and weighing 14 pounds per foot, and connected by the joints herein specifically described, the end of the female member of the top casing joint moves approximately 4/1000 of an inch in relation to the opposed part of the male joint member. This is due to the fact that when the thread of the joint is loaded with the weight of the casing, certain parts of the thread are deformed elastically until the resulting deformation of the joint as a whole has absorbed or counterbalanced the load applied thereto.

Now, if the ring or bead of welding material is applied to the threaded joint while the joint is under no load and the welded and threaded joint is thereafter subjected to a relatively high axial load, then the referred-to movement between the male and female parts of the joint subjects the welding material to a very high strain which I have discovered may cause breakage. There is no reason why the welding material should have to carry the axial load on the joint which should instead be borne by the threaded connection, and accordingly, as described above, I load the threaded joint and thereafter make the sealing weld so that in the use of the joint the weld material is not subjected to objectionable strains.

I have found that, when the welding material is employed to seal a threaded joint in accordance with the foregoing description of my improved method, and thereafter the casing string is set on the bottom of the well to relieve the tensional load on the upper joints of the casing, there is little or no danger that the welding and/or sealing material will fail. This is because the welding and/or sealing material placed in the form of a bead or ring between the male and female members of the joint is subjected to compression when the axial load on the joint is removed. While the weld metal is ordinarily not as strong as the metal of the joint when subjected to tension, it is quite strong when subjected to compression. Inasmuch as the weld metal is subjected to compression when the axial load on the joint is removed, I have found that it is not subject to failure.

The welded joint of Fig. 1 is illustrated in detail in Fig. 2 of the drawing, and includes the female pipe or casing end 20 which receives the male pipe or casing end 22. The male and female pipe ends are connected by complementary threads, indicated generally at 34. The ring or bead of welding material which is welded to the end of the female member 20 and to the opposed portion of the male member is indicated by the numeral 26 and this weld material can be applied by any known welding method, as, for example, electric arc or gas. Also, as heretofore explained, I broadly contemplate the use of any sealing means, as, for example, brazing, soldering, or the like, although welding is preferred. The female member 20 of the joint is shown in Fig. 2 as comprising a belled end, but it should be understood that the female member can be formed in any known manner, as by upsetting, or it may take the form of a coupling sleeve in which case welds 26 would have to be made at each end of the coupling, although this is not preferred. It should also be understood that the sealing ring 26 shown in Fig. 2 is not necessarily of a fillet shape but may be a thin film, for example, of brazing material, between an extending female end and the closely received male pipe end.

While many of the advantages of my invention are realized with any form of threaded joint, I have found that the specific form of thread illustrated and described is particularly satisfactory in conjunction with the sealing weld as heretofore described. Particularly, the improved thread form, as diagrammatically illustrated in Fig. 2, is of a modified Acme type and includes substantially flat crests and roots which are preferably parallel with the axis of the joint. Each of the threads is formed with substantially flat flank surfaces which form an included angle of between about approximately 0° and approximately 18°, and preferably form an included angle of about 12°.

As shown, the thread which I prefer to employ in the practice of my invention is a cylindrical thread having relatively sharp run-outs. This type of thread gives the maximum strength of thin walled pipe and, further, is readily stabbed while the joint is being made up. The thread form shown need not seal, hence it can be made with wide tolerance requirements which are easily met in production operations with standard thread-cutting equipment.

The threaded joint shown in Fig. 2 has been illustrated with the joint being subjected to axial load of tension, but it should be understood that the dimensions of the thread have been shown exaggerated to better illustrate the principles of my invention. The chief requirement of the thread form is to provide an inexpensive thread having high strength in tensional pull which can be readily made up. The welding and/or sealing material employed in conjunction with the threaded connection eliminates any necessity for the thread itself to seal. Accordingly, it should be understood that I am not to be limited to a particular thread form in the practice of my improved method of welding and/or sealing the joint while under tension. Broadly, many of the advantages of my invention result with the sealing weld being applied to any joint placed under tension, for example, a pinned, riveted, bolted, or bayonet joint.

From the foregoing it will be recognized that the objects of my invention have been achieved by the provision of a new and useful method for casing an oil well or the like, and which overcomes many of the objections to and difficulties of known casing joints, whether threaded or welded. Further, the practice of my invention results in an improved joint which is not subject to leakage or to being pulled apart in service. The welding or other sealing material prevents leakage, and the threaded connection provides more than ample strength to withstand longitudinal stress.

While in accordance with the patent statutes I have particularly illustrated and described my invention, it should be understood that I am not to be limited thereto or thereby, but that my invention is defined in the appended claims.

I claim:

1. That method of casing an oil well or the like which includes the steps of connecting a length of casing to that already supported in the well, thereafter raising the entire casing string by the elevator to put at least part of the weight of the string on the connecting joint, and sealing the joint while so supported.

2. That method of casing an oil well or the like which includes the steps of connecting with other than a welded joint a length of casing to that already supported in the well, thereafter raising the entire casing string to put at least part of the weight of the string on the joint, and ring welding the joint while so supported.

3. That method of casing an oil well or the like which includes the steps of connecting with a threaded joint a length of casing to that already supported in the well, thereafter raising the entire casing string to put at least part of the weight of the string on the threaded joint, and sealing the joint while so supported.

4. The method of casing an oil well or the like which includes the steps of supporting the casing string near its top by the usual slips or similar means, connecting another length of casing by a threaded joint to the string, connecting the added length of casing to the elevator, raising the elevator to put at least part of the weight of the string on the threaded joint, and while so supported placing a band of material around the joint so as to seal the joint.

5. That method of casing an oil well or the like which includes the steps of connecting with a threaded joint a length of casing to that already supported in the well, thereafter raising the entire casing string by the elevator to put the entire weight of the string on the threaded joint, and ring welding the joint while so supported to form a seal.

6. The method of casing an oil well or the like which includes the steps of supporting the casing string near its top by the usual slips or similar means, connecting another length of casing by a threaded joint to the string, connecting the added length of casing to the elevator, raising the elevator to put the weight of the string on the threaded joint, resetting the slips and easing the elevator off to put part of the weight of the casing on the slips and while so supporting welding a ring of metal around the joint so as to seal the joint.

HOWARD G. TEXTER.